(12) United States Patent
Staudenmaier et al.

(10) Patent No.: US 9,958,318 B2
(45) Date of Patent: May 1, 2018

(54) APPARATUS AND METHOD FOR CHECKING THE INTEGRITY OF VISUAL DISPLAY INFORMATION

(71) Applicants: Michael Staudenmaier, Munich (DE); Vincent Aubineau, Gif sur Yvette (FR); Wilhard Von Wendorff, Munich (DE)

(72) Inventors: Michael Staudenmaier, Munich (DE); Vincent Aubineau, Gif sur Yvette (FR); Wilhard Von Wendorff, Munich (DE)

(73) Assignee: NXP USA, Inc., Austin, TX (US)

( * ) Notice: Subject to any disclaimer, the term of this patent is extended or adjusted under 35 U.S.C. 154(b) by 106 days.

(21) Appl. No.: 14/899,430

(22) PCT Filed: Jul. 18, 2013

(86) PCT No.: PCT/IB2013/001836
§ 371 (c)(1),
(2) Date: Dec. 17, 2015

(87) PCT Pub. No.: WO2015/008104
PCT Pub. Date: Jan. 22, 2015

(65) Prior Publication Data
US 2016/0138968 A1   May 19, 2016

(51) Int. Cl.
*G01J 1/42* (2006.01)
*G01J 3/50* (2006.01)
(Continued)

(52) U.S. Cl.
CPC . *G01J 1/42* (2013.01); *G01J 3/50* (2013.01); *G09G 3/006* (2013.01); *G09G 5/10* (2013.01);
(Continued)

(58) Field of Classification Search
CPC ...... G01J 1/42; G01J 3/50; G01J 3/501; G01J 3/506; G09G 3/006; G09G 5/10; G09G 2380/08; G09G 2380/10; G09G 2380/12
See application file for complete search history.

(56) References Cited

U.S. PATENT DOCUMENTS 7,468,732 B2   12/2008   Okada
8,111,920 B2   2/2012   Block et al.
(Continued)

FOREIGN PATENT DOCUMENTS

DE   102004032807   2/2006
JP   2003248476   9/2003
(Continued)

OTHER PUBLICATIONS

Kang et al, "Image integrity-based gray-level error control for low power liquid crystal displays", IEEE Transactions on Consumer Electronics, Nov. 2009, pp. 2401-2406, vol. 55, Issue: 4.
(Continued)

*Primary Examiner* — John Lee

(57) ABSTRACT

The invention provides an apparatus and method for checking the integrity of visual display information and has particular application to checking images displayed in an automotive vehicle, such images containing safety critical information. The image intensity is checked only to an extent commensurate with a human being able to interpret its correct meaning. Hence, images which are defective in some way yet still recognisable by the human eye are not classified as failures. In one embodiment, a part of the image containing safety critical information is segmented into smaller areas and the luminance of pixels in each segmented area is compared with a threshold brightness level and a threshold darkness level. A histogram for each area is generated and compared with a reference.

14 Claims, 3 Drawing Sheets

(51) Int. Cl.
*G09G 3/00* (2006.01)
*G09G 5/10* (2006.01)

(52) U.S. Cl.
CPC ..... *G09G 2380/08* (2013.01); *G09G 2380/10* (2013.01); *G09G 2380/12* (2013.01)

(56) References Cited

U.S. PATENT DOCUMENTS

| | | | |
|---|---|---|---|
| 8,243,077 | B2 | 8/2012 | Cheng |
| 2005/0276514 | A1* | 12/2005 | Fisher ................ G06T 7/001 382/286 |
| 2007/0046670 | A1 | 3/2007 | Hedrick et al. |
| 2008/0252489 | A1* | 10/2008 | Naimer ............... G01C 23/005 340/971 |
| 2011/0021952 | A1 | 1/2011 | Vallone |
| 2011/0057951 | A1 | 3/2011 | Bogenberger et al. |
| 2011/0063452 | A1* | 3/2011 | Fifis ..................... G06F 3/14 348/180 |
| 2012/0098842 | A1 | 4/2012 | Manz et al. |
| 2012/0194666 | A1* | 8/2012 | Jackson ............... G01C 23/00 348/123 |
| 2012/0268475 | A1* | 10/2012 | Hancock ............... G09G 5/363 345/589 |
| 2012/0327399 | A1* | 12/2012 | Nagamine ........... G01J 3/462 356/73 |
| 2013/0120437 | A1* | 5/2013 | Bajaj .................... G06T 5/00 345/597 |
| 2014/0125818 | A1* | 5/2014 | Friend ................. H04N 17/02 348/184 |
| 2016/0138968 | A1* | 5/2016 | Staudenmaier ...... G09G 3/006 250/208.1 |

FOREIGN PATENT DOCUMENTS

| | | |
|---|---|---|
| JP | 2010091617 | 4/2010 |
| JP | 2013061660 | 4/2013 |
| WO | 2012114989 | 8/2012 |

OTHER PUBLICATIONS

International Search Report for International application No. PCT/IB2013/001836 dated Apr. 21, 2014.

\* cited by examiner

US 9,958,318 B2

APPARATUS AND METHOD FOR CHECKING THE INTEGRITY OF VISUAL DISPLAY INFORMATION

FIELD OF THE INVENTION

This invention relates to an apparatus and method for checking the integrity of information sent to a visual display and has particular application to displays used to show safety-critical data, such displays being found in automotive vehicles, aircraft, medical and other industrial equipment., for example,

BACKGROUND OF THE INVENTION

Many current automotive vehicles are provided with visual displays for presenting information to the driver or passengers. Usually such displays are built into the infotainment systems or the instrument cluster. The graphical content of these displays is usually generated by a controller. Generally, the controller contains at least a CPU (central processing unit) and a GPU (graphic processing unit). Usually a part of the image content presented is considered as "safety critical." Examples of such safety critical information are a selected gear, a warning message such as low tyre pressure or an airbag malfunction. Such information is deemed safety critical because presentation of incorrect information could lead to a situation where the safety of a driver or passenger could be put at risk. Known solutions for verifying the information sent out to a display screen employ an additional apparatus. Usually a checksum is generated over critical areas of the screen and matched against pre-calculated checksums. In cases where the checksum does not match, this indicates that there is a problem with the displayed image. The display could then be entirely disabled so that incorrect information is not presented to the driver. Such an additional check method is required to fulfil the functional safety requirements to achieve an ASIL certification. US 20110057951 describes a display comprising a merged image composed of a non-safety relevant part such as a speedometer scale and a safety relevant part such as the speedometer needle. An image monitor compares a part of the image corresponding to the safety relevant part with a reference for that part. Integrity checkers employed in the known solutions ensure bit-accurate accuracy when performing their check. Such a meticulous method can lead to false alarms which can cause many cars to be sent back to the manufacturer for inspection and may lead to a poor perception of the car maker's quality.

SUMMARY OF THE INVENTION

The present invention provides an apparatus and, a method for checking the integrity of visual display information, a vehicle and computer program product as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Figure 1:
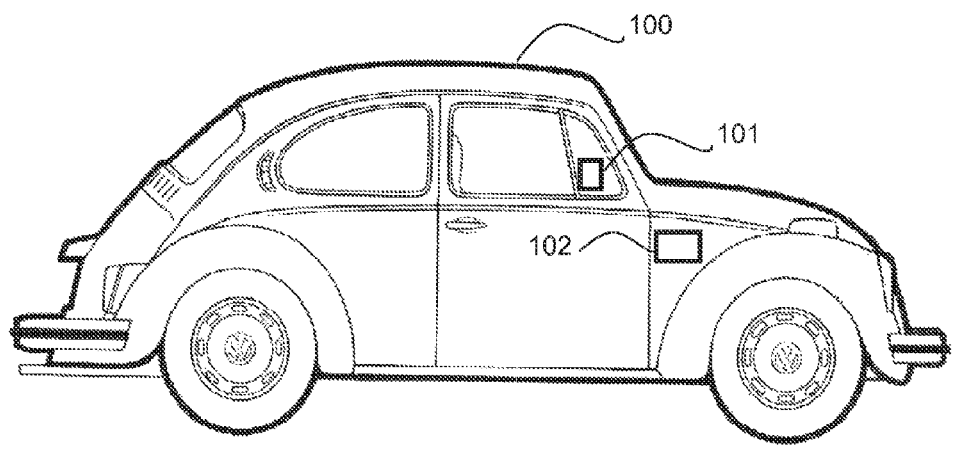
FIG. 1 schematically shows a motor vehicle equipped with a visual display and including an example of apparatus for driving a display and for checking the integrity of visual display information.

With reference to FIG. 1, a vehicle 100 includes a visual display unit 101 which may form part of an instrument cluster (not shown) of the vehicle. Apparatus 102 for driving the visual display unit 101 and for checking the integrity of information sent to the visual display may also be mounted in the vehicle 100 and will be described in greater detail below with reference to FIG. 2

Figure 2:
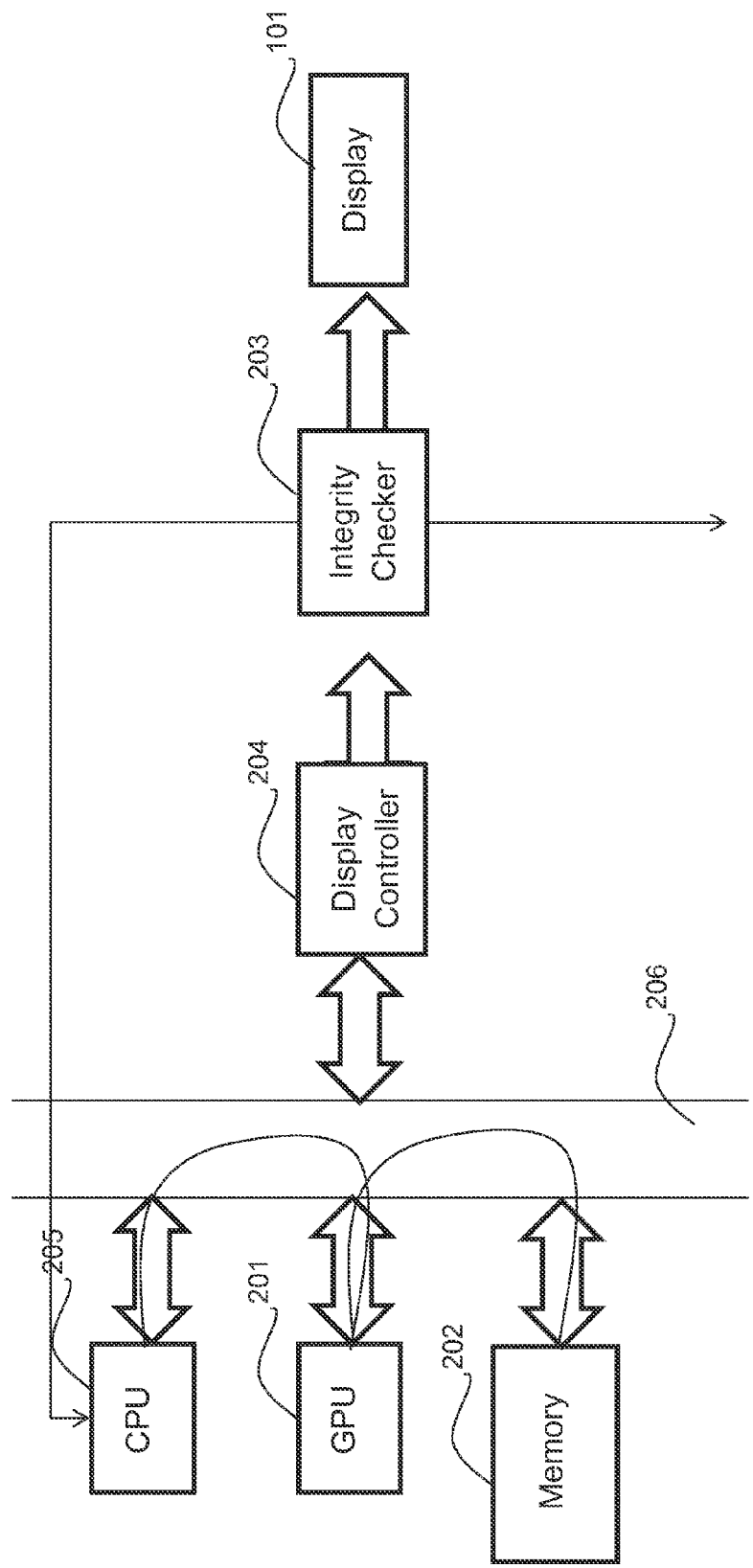
FIG. 2 is a simplified block diagram of an example of a system for displaying images, the system including an example of apparatus for checking the integrity of visual display information.

Referring now to FIG. 2, a graphics processing unit (GPU) 201 may generate an image in memory 202 which may be sent to an integrity checking module 203 using a display controller 204. In one embodiment, graphical content may be generated without a dedicated GPU. In this case, the required functionality may be provided by a central processing unit 205, for example, or by the display controller 204.

Generated visual content may be displayed to the occupants of the vehicle on the visual display unit (VDU) 101. The generated visual content may comprise a safety critical part and a non-safety critical part. In one example, a non-safety critical part may be a graphical image of a speedometer dial and a safety critical part may be the speedometer needle. In another example, the entire visual content may be safety critical and may comprise a numeral, for example, the number of a gear currently engaged by the vehicle's transmission system. In the example of FIG. 2 the integrity checker 203 may be arranged to monitor the information being sent to the VDU 101 and generate an error signal, for transmission to the CPU 205 via a communications bus 206, for example, or to another external controller (not shown), if the information fails to meet certain criteria. In one embodiment, the integrity checker module 203 may be integrated with the VDU 101. This has the advantage that the integrity checker may be arranged to detect any errors introduced by the signal transmission process from the GPU 201 through the display controller 204 to the display on 101.

The inventors have recognised that the integrity of an image needs to be checked only to an extent commensurate with a human being able to interpret its correct meaning. In this case, an error may be reported only when the human observer can no longer unambiguously understand the information presented on the display. This has the advantage that images which are defective in some way yet still recognisable by the human eye are not classified as failures. In one embodiment, a classification of display data based on counting high and low intensity pixels may be used as a criterion for acceptance of a display image within certain limits of incorrect intensity pixels. Hence the continued operation of a display system with small, acceptable failures may be allowed.

The visual display unit 101 may be arranged to display images comprising a plurality of pixels and may be implemented using known display technologies including, for example, liquid-crystal displays, organic light emitting diodes, or flexible displays.

Figure 3:
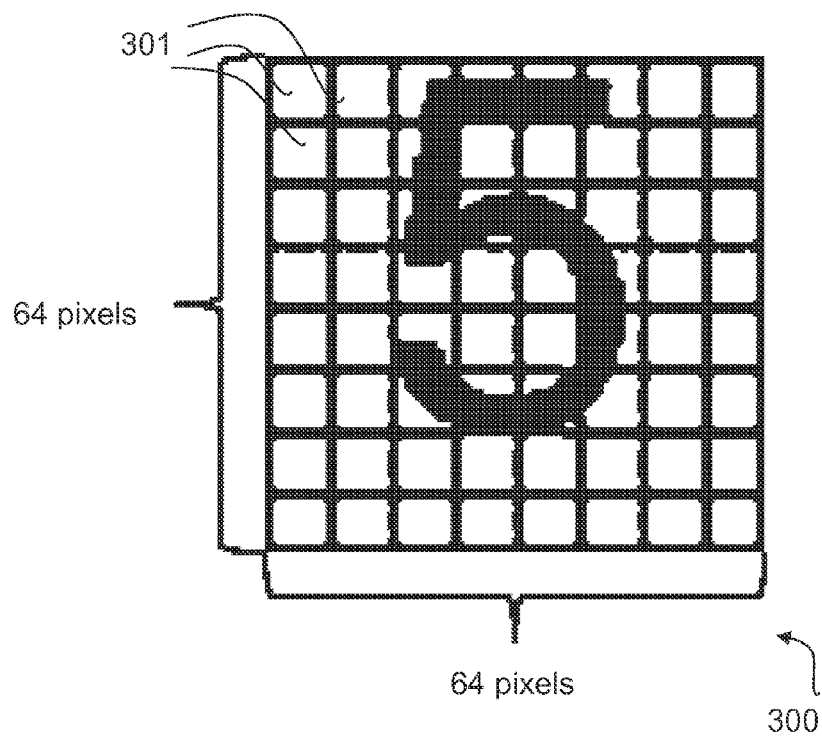
FIG. 3 is a representation of an example of a safety critical image as displayed on a visual display unit.

In one embodiment, the visual display unit 101 may comprise a screen composed of a plurality of pixels on which may be displayed an image comprising a numeral (see FIG. 3). The numeral (the number "5" in this example, may appear as a black image on a white background. In other examples, the image may comprise a coloured numeral on a white, black or contrasting coloured background. In another example, the image may comprise arbitrary shapes of different colours or grey scales.

In some embodiments, the entire image or pre-defined sections of an image may be segmented into a plurality of areas in the integrity checker 203. Those sections which are segmented may contain safety critical information. Each area may be composed of a predetermined number of pixels. The segmented areas may be adjacent to each other. In other embodiments, areas with gaps in between them or overlapping areas may be used instead. Further, the segmented areas may be, for example, rectangular or square, circular or ellipsoidal or any other arbitrary two-dimensional shape. In the case of arbitrary shapes, a mask per pixel may be employed in order to decide if a pixel belongs to a particular segment.

Once the areas comprising the plurality of pixels have been segmented, then for each area, the integrity checker 203 may be arranged to compare one or more pixel attributes of each pixel with one or more predetermined values to determine whether or not a particular pixel meets a predetermined criterion. Such pre-determined values may be stored in the integrity checker 203. One example of a pixel attribute is a luminance level. In one example, the integrity checker 203 may be arranged to decide if a particular pixel is above a specified brightness threshold value or below a specified darkness threshold value. This example may find application in the example shown in FIG. 3 where the image to be displayed comprises a black numeral on a white background. In another example embodiment, the integrity checker 203 may be arranged to compare the luminance of individual pixels against multiple threshold values. This example may find application for images composed of shapes or lettering in varying shades of grey. In another alternative embodiment, a pixel attribute may comprise colour. In one such example, the integrity checker may be arranged to compare a colour of each pixel with one or more stored colour values. In another embodiment, the luminance of pixels having a predefined colour, red say, may be compared against a predetermined luminance level for that colour.

The integrity checker 203 may be arranged to count and store, for each segmented area, the number of pixels whose compared attributes meet a predetermined criterion. For example, in the case of the image of FIG. 3, the number of pixels (N1) having a luminance above a predetermined brightness threshold may be counted and recorded and the number of pixels (N2) having a luminance below a predetermined darkness threshold may be counted and recorded. In one example, for each segmented area, a histogram may be generated. A histogram generated in this example may have two bins of size N1 and N2. More bins may be used for cases where grey scale comparisons are made. The use of histograms in the field of display image processing is known. See for example, Image Integrity-based Gray-Level Error Control for Low Power Liquid Crystal Displays, Transactions on Consumer Electronics, IEEE, November 2009, Suk-Ju Kang, Young Hwan Kim, Volume: 55 , Issue: 4, Page(s): 2401-2406. In alternative examples, the integrity checker may count and store, for each segmented area, the number of pixels having particular grey scale levels or particular colours. Histograms for each segmented area may be generated in these alternative examples also. In one example, the integrity checker 203 may comprise a plurality of histogram modules, each module generating a histogram for each segmented area. Such a histogram module may comprise one or more counters for recording the numbers of pixels which meet one or more predetermined criteria. For example a histogram module may comprise one counter for bright pixels and one counter for dark pixels.

In another example, the integrity checker 203 may be arranged to detect if a specific symbol, for example a Chinese character, is displayed at a specific position in the displayed image. In such a case, the integrity checker may be arranged to segment the areas in a particular way in order to suit the application. Segmented areas of a particular size and position within the displayed image may be selected in a way that leads to the best detection results for the expected character. Further, each symbol may be assigned a specific segmentation, number of bins in an appropriate histogram and threshold values.

The integrity checker 203 may further be arranged to compare, for each segmented area, the number of pixels whose attributes meet a predetermined criterion with one or more reference values. A reference value may be unique to each of the segmented areas. The reference values may be stored in the integrity checker 203. In one example, the number of pixels whose luminance exceeds a certain threshold may be compared with a reference value. The integrity checker 203 may be further arranged to generate an error notification signal for transmission to the CPU 202 for example if fewer than a certain number of pixels comprising one or several segmented areas fail to meet the predetermined criterion.

Figure 4:
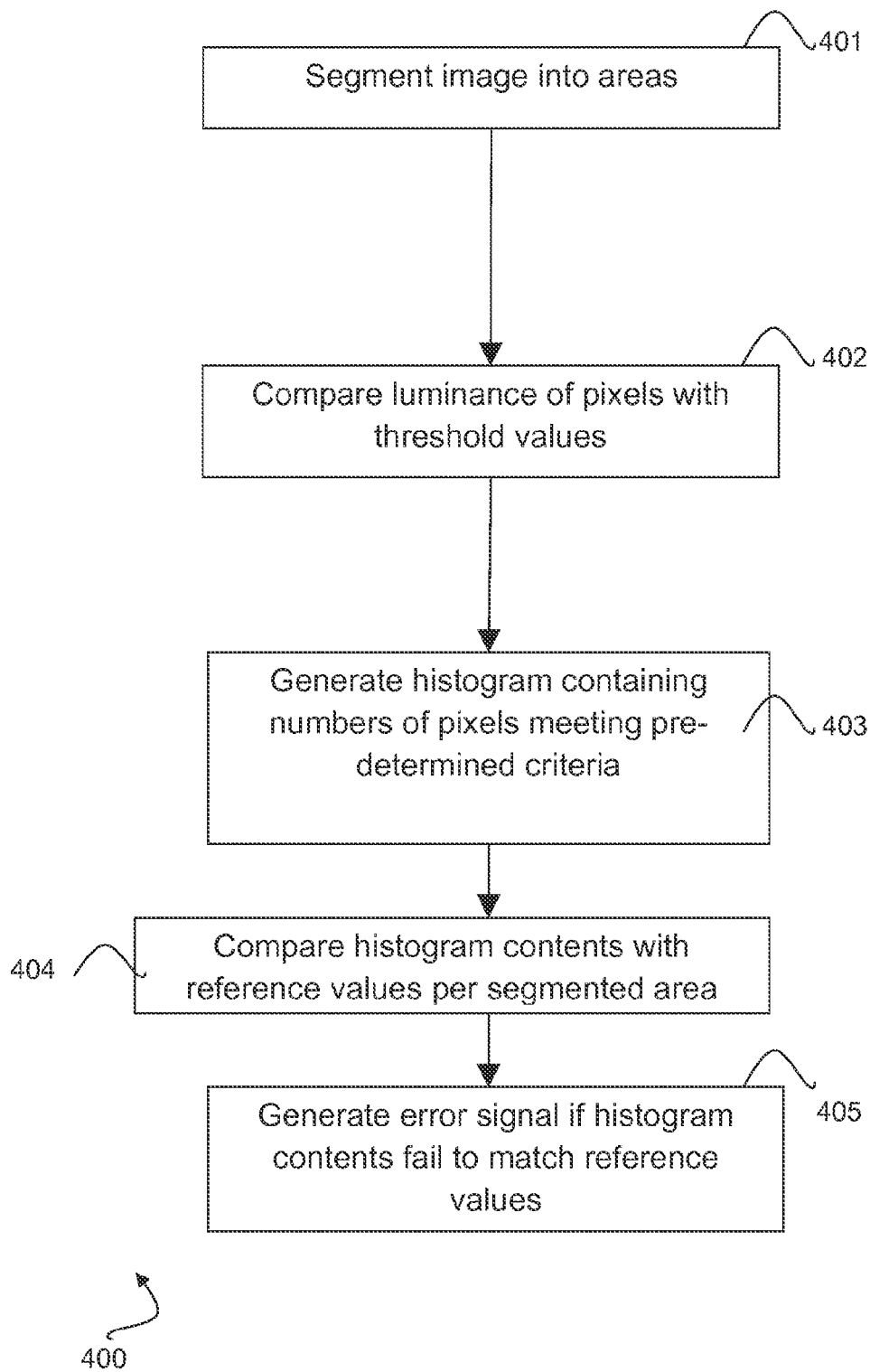
FIG. 4 is a simplified flowchart illustrating an example of a method for checking the integrity of visual display information.

An example of a method 400 for checking the integrity of visual display information will now be described with reference to FIG. 3 and the simplified flowchart of FIG. 4.

In this example, visual display information to be checked relates to an image 300 which comprises a black numeral "5" on a white background. The image comprises 64×64 pixels. The numeral 5 relates to safety critical information. At 401, the image 300 is segmented into a plurality of segmented areas 301. In this example, the areas are adjacent to one another and each area is square and comprises 8×8 pixels.

At 402, for each segment 301, the luminance of each pixel comprising a segmented area may be compared with a brightness threshold and with a darkness threshold. So in this example, those pixels which comprise part of the numeral 5 will have a luminance less than the darkness threshold and those pixels which form part of the background will have a luminance greater than the brightness threshold. Pixels which are at fault may have a luminance which lies somewhere between these two thresholds.

At 403, for each segment 301, the numbers of pixels having a luminance less than the darkness threshold and the number of pixels having a luminance greater than the brightness threshold may be determined. Optionally, the number of pixels which have a luminance somewhere between these two thresholds may be determined. Thus, numbers of pixels which have an attribute (in this example a luminance) which meets one or more predetermined criteria (for example a luminance level) may be determined. The determination process may comprise generating a histogram for each segment. Such histograms may contain the number of black pixels, white pixels and, optionally, greyscale pixels in each segment.

At 404, the numbers of black pixels, white pixels and grey scale pixels per segmented area may be compared with reference values. There may be a unique reference value per segmented area. For example, as can be seen from FIG. 3, in the ideal case, most of the segmented areas require that all of their pixels be bright. Those segmented areas which display part of the numeral 5 require that at least 50% of their pixels be black. The reference values for each segmented area may be ideal values (representing a perfect image) which have been modified by an adjustment thereby allowing a deviation from the ideal case in order to accommodate the fact that a human observer can still interpret the displayed number even if a certain percentage of pixels which should be black are actually determined to be white, or vice versa. This comparison process may comprise comparing histogram counters (i.e. the size of a particular histogram bin) against the reference values. Reference values may be predetermined and stored in the integrity checker or alternatively may be calculated remotely and made accessible to the integrity checker, via the CPU 205 for example.

In one embodiment, the selection of threshold values to determine whether or not a pixel falls into a dark or s bright category, for example, may be varied in order to add some "fuzziness" to the comparison which equates with how the human observer interprets images.

At 405, an error notification signal may be generated if it is found that a determined number of pixels in one or more segmented areas does not match the appropriate reference value. For example, if fewer than 20% of pixels in half of those segmented areas which are intended to display the numeral 5 are classified as "black" then this may be deemed as a failure in the integrity of the visual display information. Such an error notification signal may be transmitted to a central processing unit, for example, which may disable further generation of visual display information signals.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

As an example, a tangible computer program product may be provided having executable code stored therein to perform a method for checking the integrity of visual display information as disclosed herein.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims. For example, the visual display information integrity checker 203 may find application with displays other than those found in automotive vehicles. For example it may find application with displays used in aircraft and medical equipment. The terms "front," "back," "top," "bottom," "over," "under" "left" and "right" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognise that the boundaries between logical blocks or modules are merely illustrative and that alternative embodiments may merge logic blocks or modules or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, the integrity checker of FIG. 2 may comprise one module or several modules, each performing one or more processes.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Further, the entire functionality of a visual display information integrity checker according to the examples described herein may be implemented in an integrated circuit. Alternatively, an integrity checker in accordance with the invention may be integrated with the graphics processor 201 and/or the CPU 202. An integrated circuit may be a package containing one or more dies. Alternatively, the examples may be implemented as any number of separate integrated circuits or separate devices interconnected with each other in a suitable manner. For example, an integrated circuit device may comprise one or more dies in a single package with electronic components provided on the dies that form the modules and which are connectable to other components outside the package through suitable connections such as pins of the package and bondwires between the pins and the dies.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

The invention claimed is:

1. Apparatus for checking the integrity of visual display information wherein the visual display information represents an image comprising a plurality of pixels, the apparatus being arranged to:
   segment at least a part of the image into a plurality of segmented areas
   compare, for each segmented area, at least one attribute of each pixel therein with a first predetermined value and a second predetermined value;
   determine, for each segmented area, a number of pixels which meet a first predetermined criteria, wherein a pixel meets the first predetermined criteria based on the at least one attribute being greater than the first predetermined value;
   determine, for each segmented area, a number of pixels which meet a second predetermined criteria, wherein a pixel meets the second predetermined criteria based on the at least one attribute being less than the second predetermined value;
   compare, for each segment area, the determined number of pixels which meet the first predetermined criteria with a first reference value;
   compare, for each segment area, the determined number of pixels which meet the second predetermined criteria with a second reference value; and
   generate an error signal if the determined number of pixels which meet the first predetermined criteria in one or more segmented areas fails to match the first reference value or if the determined number of pixels which meet the second predetermined criteria in one or more segmented areas fails to match the second reference value.

2. The apparatus of claim 1 wherein an attribute of a pixel comprises a luminance.

3. The apparatus of claim 1 wherein an attribute of a pixel comprises a colour.

4. The apparatus of claim 2 wherein a first predetermined value is a brightness level and a second predetermined value is a darkness level.

5. The apparatus of claim 1 wherein a segmented area is four-sided.

6. The apparatus of claim 1 wherein a segmented area is circular.

7. The apparatus of claim 1 wherein the segmented areas are adjacent to one another.

8. The apparatus of claim 1 wherein the apparatus is arranged generate a histogram for each segmented area, said histogram comprising a number of pixels within each segmented area which meet one or more predetermined criteria.

9. The apparatus of claim 1 wherein at least a part of the image which is segmented relates to safety critical information.

10. The apparatus of claim 1 wherein the apparatus is implemented in an integrated circuit device.

11. A vehicle comprising the apparatus of claim 1.

12. A method for checking the integrity of visual display information wherein the visual display information represents an image comprising a plurality of pixels, the method comprising:
    segmenting at least a part of the image into a plurality of segmented areas;
    comparing, for each segmented area, at least one attribute of each pixel therein with a first predetermined value and a second predetermined value;
    determining, for each segmented area, a number of pixels which meet a first predetermined criteria, wherein a pixel meets the first predetermined criteria based on the at least one attribute being greater than the first predetermined value;
    determining, for each segmented area, a number of pixels which meet a second predetermined criteria, wherein a pixel meets the second predetermined criteria based on the at least one attribute being less than the second predetermined value;
    comparing, for each segment area, the determined number of pixels which meet the first predetermined criteria with a first reference value;
    comparing, for each segment area, the determined number of pixels which meet the second predetermined criteria with a second reference value; and
    generating an error signal if the determined number of pixels which meet the first predetermined criteria in one or more segmented areas fail to match the first reference value or if the determined number of pixels which meet the second predetermined criteria in one or more segmented areas fail to match the second reference value.

13. The method of claim 12 wherein determining the number of pixels which meet one or more predetermined criteria comprises generating a histogram.

14. A tangible non-transitory computer program product having executable code stored therein to perform a method for checking the integrity of visual display information in accordance with claim 12.

* * * * *